United States Patent
Azeau

(10) Patent No.: US 7,565,778 B2
(45) Date of Patent: Jul. 28, 2009

(54) COMPOSITE PROTECTION FOR REVEALING DAMAGE TO A CORE IN A VEHICLE SUCH AS AN AIRCRAFT

(75) Inventor: Jean Azeau, Fuveau (FR)

(73) Assignee: Eurocopter, Marignane (FR)

( * ) Notice: Subject to any disclaimer, the term of this patent is extended or adjusted under 35 U.S.C. 154(b) by 717 days.

(21) Appl. No.: 11/116,443

(22) Filed: Apr. 28, 2005

(65) Prior Publication Data
US 2005/0248191 A1 Nov. 10, 2005

(30) Foreign Application Priority Data
Apr. 28, 2004 (FR) .................................. 04 04533

(51) Int. Cl.
*E04B 1/00* (2006.01)
(52) U.S. Cl. .................. 52/741.3; 52/403.1; 52/309.15
(58) Field of Classification Search ............. 428/423.7, 428/425.1; 52/741.3, 408, 403.1, 309.7, 52/309.8, 309.9, 309.15, 309.16, 316
See application file for complete search history.

(56) References Cited
U.S. PATENT DOCUMENTS

| | | | | |
|---|---|---|---|---|
| 5,746,102 A | * | 5/1998 | Benzing et al. ................ 83/34 |
| 5,947,918 A | * | 9/1999 | Jones et al. ..................... 602/58 |
| 6,659,020 B1 | * | 12/2003 | Ball ......................... 108/57.28 |
| 6,673,177 B2 | * | 1/2004 | Buckwalter et al. ........... 156/71 |
| 7,081,300 B2 | * | 7/2006 | Laurence et al. .......... 428/423.7 |
| 7,381,860 B2 | * | 6/2008 | Gudnason et al. ............. 602/55 |

FOREIGN PATENT DOCUMENTS

| | | |
|---|---|---|
| DE | 103 40 561 | 3/2004 |
| EP | 1 034 921 | 9/2000 |
| EP | 1 344 634 | 9/2003 |
| GB | 2 242 002 | 9/1991 |
| WO | WO 2004/003403 | 1/2004 |

\* cited by examiner

*Primary Examiner*—Richard E Chilcot, Jr.
*Assistant Examiner*—Chi Q Nguyen
(74) *Attorney, Agent, or Firm*—Young & Thompson

(57) ABSTRACT

The composite structure for protecting a main core comprises a laminated surface covering having a rigid protective layer and an elastomeric member. A damage tell-tale is inserted between the rigid protective layer and the elastomeric member. The composite structure thus serves both to protect the core and to reveal damage suffered by the core. The structure is applicable, for example, to protecting a structural element of a vehicle such as a helicopter.

19 Claims, 2 Drawing Sheets

Fig.1
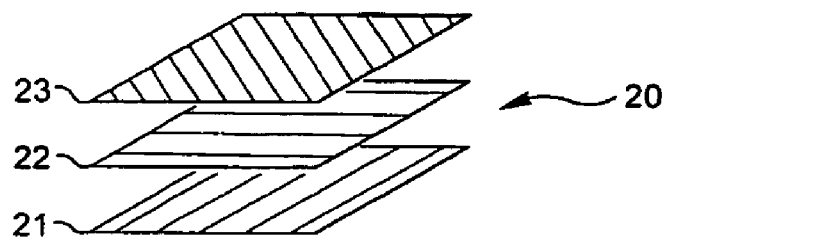
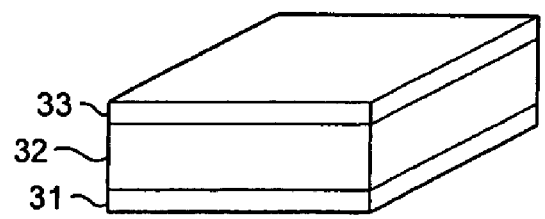
Fig.2
Fig.3
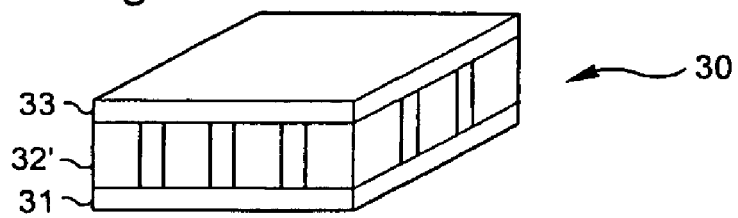
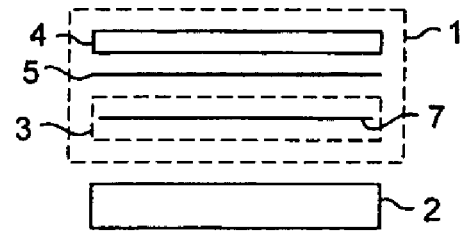
Fig.4
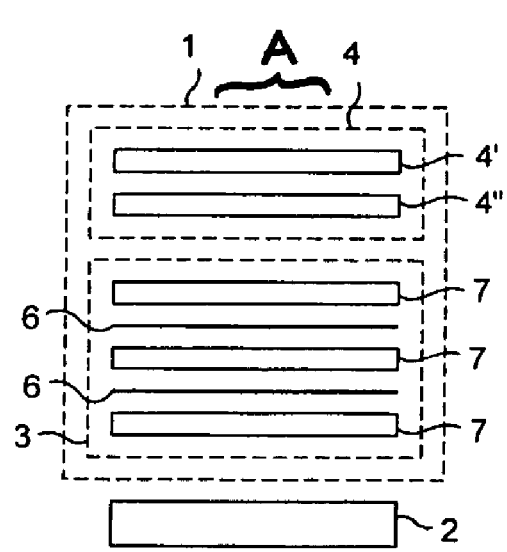
Fig.5
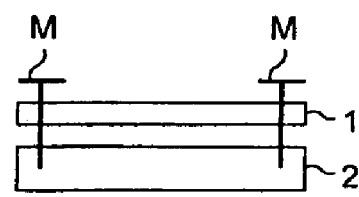
Fig.6

101; 102; 103

101
100
102
103

COMPOSITE PROTECTION FOR REVEALING DAMAGE TO A CORE IN A VEHICLE SUCH AS AN AIRCRAFT

FIELD OF THE INVENTION

The invention relates to protecting a structural assembly of a transport vehicle, such as an aircraft. Such a "structural assembly" is referred to below by the term "core".

In the meaning of the invention, a "structural assembly" or "core" is a mechanical assembly such as a single part or a functional group of parts that is to constitute a portion of the vehicle and that, once integrated in the vehicle, contributes to its normal operation.

The invention serves to protect such a core against damage.

In addition, still in the meaning of the invention, the core to be protected is said to be "structural" since it is stressed during normal operation of the vehicle by loading that is static and/or dynamic.

The core may be subjected, in operation, to damage due to attack (impact, erosion, nicking or grooving, lightning, flame, heat, etc.) from the environment surrounding the vehicle.

Nevertheless, the core is such that intrinsically it is unsuitable or poor at revealing such damage, such that the damage can be impossible or difficult to take into consideration.

In order to explain in greater detail the concepts of attack, damage, and a core to be protected in the meaning of the invention, a particular example is used, comprising a core of composite structure that is highly stressed mechanically by static and/or dynamic loading, and that needs simultaneously to be tolerant to certain kinds of external attack (including impacts and the like), while guaranteeing a very high level of safety.

Because of the field of activity from which the invention comes, it is described by way of example in the context of a vehicle, and in particular a helicopter.

Naturally, the invention applies to other fields, such as land or sea vehicles, where it can be useful to protect a central core against attack from the environment, and also to be able to reveal damage caused by such attack.

BACKGROUND OF THE INVENTION

There follows an explanation of this dual problem of protecting a structural core against damage from the environment and of revealing that damage if any, in the context of transport vehicles.

In this field, regulatory requirements laid down by certification organizations, in particular in aviation, specify that the dimensioning of vehicle structures must take account of the effects that the environment can have on their structural integrity, their ability to withstand mechanical impacts, and the potential for propagation of damage, particularly for parts that are strongly subjected to fatigue stresses, i.e. parts under the combined action of both static and dynamic loading.

It is in this context that structural assemblies made of composite materials were introduced.

Such structural assemblies of composite materials thus make it possible to reduce the mass of a vehicle, to avoid problems due to corrosion, and also to provide positive responses to the requirements of certification organizations.

In practice, structural assemblies made of composite materials have given satisfaction in many aspects.

In particular their mechanical performance (stiffness, strength) have been found to be at least equivalent, and often better than the performance of assemblies made of isotropic metals (light alloys, titanium, steels, and other similar materials), while also achieving for equivalent structural assemblies, a substantial saving in weight.

These advantages come in particular from the intrinsic makeup of the materials used in such structural assemblies made of composite materials.

In general, prior art composite material structural assemblies comprise an organic matrix with continuous or discontinuous fiber reinforcement (e.g. textile reinforcement).

The organic matrix, e.g. a thermosetting resin, serves to keep the reinforcement in position and properly oriented.

The matrix serves to transfer loads between the parts of the reinforcement and thus acts as a binder in the composite material structural assembly.

The reinforcement is made in particular out of fibers (glass, carbon, aramid, . . . ). When the fibers are continuous, the reinforcement often has its fibers extending in the direction of the main mechanical stresses imparted to the composite material structural assembly.

Thus, the reinforcement confers on the composite material structural assembly its mechanical performance in terms of stiffness and breaking strength, while also achieving a saving in mass compared with equivalent structural assemblies made using metal alloys, for example.

There exist several conventional types of composite material structural assemblies.

One type of composite assembly is said to be "monolithic", comprising a stack built up from a predetermined sequence of individual plies having reinforcement, e.g. in the form of fabrics or unidirectional sheets, and impregnated with an organic matrix.

By way of example, these individual plies are made up of carbon fibers impregnated with a thermosetting resin.

Another type of composite material structural assembly is the "sandwich" type.

A sandwich composite assembly has a core sheet of foam or honeycomb within a stack constituting a predetermined sequence of individual plies provided with reinforcement impregnated with an organic matrix.

Nevertheless, whatever their type, when they have at least two plies of impregnated textile reinforcement, structural composite assemblies present mechanical behavior that is strongly anisotropic and they thus present a specific mode of degradation in the face of external attack.

Because of their stratified composition, and because of the weak mechanical properties of the plies in directions that are transverse to the direction of the reinforcement, such composite structural assemblies are generally sensitive to shock or impact concentrated at a point.

Shocks or impacts cause delamination and loss of cohesion between the various plies of a composite structural assembly.

The delamination and loss of cohesion can lead to complete failure in the mechanical behavior of a composite structural assembly.

Mostly, when the delamination occurs within the composite assembly, it is not always identifiable by ordinary inspection techniques, in particular visual inspection. This is unlike metal structures, where any damage caused by an impact is generally detected visually.

Thus, unlike metal structures, the damage caused by an impact is not visually detectable on a composite structure.

Unfortunately, in numerous examples of composite structure assemblies, integrity of the assembly is essential for the safety of the intended vehicle and its passengers.

As a result, at present, it is necessary, at regular intervals, to perform inspection using ultrasound means in reflection or in transmission in order to be sure that a critical composite structural assembly has indeed conserved its mechanical performance.

It will be understood firstly that such inspection techniques are not completely reliable.

Secondly, they are difficult and often expensive to implement. In particular it is often necessary to take the vehicle temporarily out of service for inspection purposes, which is penalizing in operating terms, particularly in the field of aviation.

To sum up, composite structural assemblies are subjected in practice to damage because of the impacts and shocks they suffer, which can lead to situations that can become catastrophic insofar as the damage can be hidden and go unrepaired.

In order to mitigate this situation, one solution leads sometimes to providing composite structural assemblies that are overdimensioned, e.g. by adding reinforcing plies.

Such overdimensioning is particularly important when using unidirectional textile reinforcement, since such reinforcement is less tolerant to damage than is continuous woven reinforcement.

In addition, composite structural assemblies that are overdimensioned in this way lose some of the advantage associated with the light weight of composite materials, e.g. when compared with metals.

Another solution consists in making the reinforcement out of fibers that present high resistance to impact, such as aramid fiber.

Nevertheless, the highly hygroscopic behavior of such high-strength fibers leads to problems due to moisture being absorbed and degrading the interface between the fibers and the matrix.

Furthermore, such fibers are difficult to work and to cut, so they are particularly expensive and difficult to implement industrially.

In addition, in order to find a solution to the problem of enabling composite structural assemblies to withstand shocks, certain suppliers of textile reinforcement preimpregnated with an organic matrix, in particular of the epoxy type, have optimized the formulation of such matrices by incorporating thermoplastic plasticizers.

Unfortunately, matrices including thermoplastic plasticizers are expensive and they affect the mechanical performance of composite structural assemblies in ways unrelated to impact resistance, for example stiffness at high temperature.

In addition, those solutions do not solve the crucial problem of revealing damage.

In addition to impact, the intrinsic mechanical characteristic of composite structural assemblies can also be degraded by other kinds of attack from the environment.

Such other environmental attacks are constituted in particular by erosion (specifically under the effect of rain), grooving or nicking, lightning, flame, temperatures higher than acceptable values, and certain aggressive chemicals such as solvents.

On the same lines, composite structural assemblies can present vibratory behavior that is different from that of an equivalent structure made of metal, for example.

To counter such environmental attack, the problem of providing protection and of revealing damage does not have a prior art solution, any more than does the problem of impact damage.

Various documents are mentioned below that illustrate the above in prior art structures.

Document DE 4 208 842 describes an adhesive strip for protecting an edge of a helicopter rotor blade against erosion.

The strip is made of metal and it is stuck to the blade by means of a coating of metal particles.

That document does not describe revealing damage to the structure that is to be protected, since in the event of perforation the protection is removed and replaced.

Document DE 10 340 561 describes a structural member made of lightweight composite material for a motor vehicle or an aircraft such as a helicopter.

The member which is of plane or concave shape is designed to withstand crashes, impacts, or explosions.

That anticrash material is provided with one or more solid layers of metal (in particular aluminum) or of glass fibers.

An elastomer layer is placed on said layer, with the elastomer containing a tangle of reinforcing fibers.

Document EP 1 034 921 describes a multilayer composite structure for protecting members that are subjected to erosion, such as the lift members of aircraft.

In that structure, a covering layer is assembled on a substrate of material reinforced with metal fibers.

The covering layer comprises a thickness of metal fibers and a metal sheet that forms the outside face of the structure.

In order to improve the surface adhesion of the covering layer on the substrate, the porosity of the face of the thickness that is facing the metal sheet is less than the porosity of its face that is facing the reinforcing fibers.

Document EP 1 344 634 describes fabricating a helicopter rotor blade by inserting a core in a matrix that is then covered in layers of composite material, the resulting assembly being placed in a mold and then heated.

Document GB 2 242 002 describes a support for a heavy object such as a building that is to be protected against seismic shocks.

That support comprises alternating rigid plates and layers of rubber.

Those plates and layers are not bonded to one another, at least not in a peripheral zone.

Document WO 2004003403 describes a spring blade made up of a plurality of layers of different polymer materials.

A resilient inner layer acts as an absorber and defines a housing for receiving a filler insert.

None of those documents provides protection against environmental attack which:
firstly increases the intrinsic ability of the composite material to withstand one or more types of attack, e.g. by raising the energy level needed for the impact to cause damage; while simultaneously
leaving a permanent trace on the composite structure in the event of it being damaged, so as to make it easy to see that damage has been done.

OBJECTS OF THE INVENTION

From the above, it will be understood that an object of the invention is to provide protection that reveals damage that has been generated in a composite structural assembly (referred to as a "core") by at least one type of environmental aggression, including impact.

It is appropriate to recall at this point that a core is subjected in normal operation of the vehicle to loads, and may suffer damage while in operation, due in particular to impacts, but is intrinsically incapable or poor at revealing such damage.

This definition naturally covers the composite structural assemblies mentioned in the explanatory example given above. However in the meaning of the invention, a structural assembly made out of metal or other material(s), for example, is also considered as constituting a structural core to be protected.

In the alternative, another object of the invention is to provide means for diagnosing damage to a vehicle structural core (e.g. in terms of shape, depth, extent) that are simple and quick to implement.

Starting from such a diagnosis, the invention thus makes it possible to deduce action criteria applicable to the damaged structural assembly and/or to the vehicle that includes it (for example whether it can return to normal operation with or without restrictions on use, whether it can be repaired, or whether it should be rejected).

The invention thus seeks to conserve the main inherent advantages of structural assemblies (in particular low density in terms of weight and good mechanical behavior in the example of composite cores), while greatly limiting firstly the effects of attacks of external origin that generally weaken such integrity, and secondly the risks associated with damage not being revealed.

BRIEF SUMMARY OF THE INVENTION

To this end, the invention provides a method of protecting a main core of a vehicle against environmental attacks, in particular impact, using a composite structure held attached to the main core.

The structure comprises at least one laminated surface covering having at least one elastomeric member and a protective layer.

When an environmental attack is applied to the composite structure:
- said attack is initially intercepted by the protective layer interposed for this purpose at least in part between the main core and an attack zone of the environment from which an impact might occur; and
- at least a fraction of the energy intercepted from an environmental attack by the interposed protective layer is then distributed and/or absorbed by the laminated surface covering.

According to the invention, when the attack from the environment that is applied to the composite structure presents energy above a predetermined threshold suitable for subjecting the main core to damage, at least a fraction of said energy is transferred to the main core and also to a damage tell-tale that is integrated at least in part in the composite structure so as to reveal the damage.

In an implementation, the protection of the main core of the vehicle relates to attack from the environment in the form of impact and also to at least one other type of mechanical attack, e.g. erosion and/or nicking or grooving, or the like.

In an implementation, the protection of the main core of the vehicle relates to attack from the environment in the form of impact and also to at least one other type of attack of physicochemical nature, e.g. heating and/or exposure to flame and/or electromagnetic discharge such as lightning.

The invention also provides a composite structure for protecting a main core to which said composite structure is to be held attached within an intended vehicle.

The composite structure comprises at least one laminated surface covering having at least an elastomeric member and a rigid protective layer.

According to the invention, a damage tell-tale is arranged in the laminated surface covering; said tell-tale being such that in the event of an attack being applied to the composite structure from the environment, in particular an impact, having energy greater than a predetermined threshold such that the attack subjects the main core to damage, said damage is revealed by the laminated surface covering.

In an embodiment, the damage tell-tale is interposed within the laminated surface covering, e.g. between an external protective layer and an elastomeric member disposed substantially adjacent thereto.

In another embodiment, the damage tell-tale is a colored dye, e.g. a liquid and/or in film form.

In yet another embodiment, the damage tell-tale is a plastically-deformable layer of the laminated surface covering, e.g. the damage tell-tale is an outer protective layer of ductile material such as soft metal or the like.

In an embodiment, the main core and the composite structure are integrated one to the other, the core being of monolithic or sandwich type, for example.

In another embodiment, the composite structure is for being held attached on the main core by mechanical means or the like, e.g. mechanical means are provided for holding the laminated surface covering attached to the main core in separable manner.

In an embodiment, the elastomeric member comprises a single strip of elastomeric material.

For example, the elastomeric strip may be constituted by a "visco-stress" elastomer.

In another embodiment, the elastomeric member comprises at least one elastomeric stack made up of an intermediate rigid ply arranged between two strips of elastomeric material.

In an embodiment, at least one intermediate rigid ply comprises a metal.

In an embodiment, at least one intermediate rigid ply comprises an organic composite material.

In an embodiment, the rigid protective layer is constituted by a metal.

In another embodiment, the rigid protective layer is constituted by a composite material.

In an embodiment, the elastomeric member having a single strip or a set of strips of elastomeric material in said member is constituted exclusively of at least one elastically deformable material of low compressibility, and has no fiber reinforcement or the like.

In an embodiment, the protective layer comprises at least one protective stack provided with a first main ply of metal and a second main ply of organic composite material.

An embodiment of the structure uses the above-specified protection method.

The invention also provides a vehicle having the above-specified method applied thereto and/or including at least one composite structure as set out above.

In an embodiment, the vehicle is a rotary wing aircraft such as a helicopter, e.g. possessing a composite structure in a connection zone for a tail spar tube that constitutes the main core.

BRIEF DESCRIPTION OF THE DRAWINGS

Other features of the invention appear in the following description of implementations given by way of indication with reference to the accompanying figures, in which:

FIG. 1 shows a prior art composite structural assembly of monolithic type;

FIG. 2 shows a prior art composite structural assembly of sandwich type having a foam core;

FIG. 3 shows a prior art composite structural assembly of sandwich type having a honeycomb core;

FIG. 4 is a section view of a structural assembly having a protective composite structure of the invention for revealing damage;

FIG. 5 is a section view of a structural assembly having a protective composite structure of the invention, with a laminated surface covering provided with a protective stack and two elastomeric stacks;

FIG. 6 is a section view of a structural assembly having a protective composite structure of the invention, with a removable laminated surface covering;

MORE DETAILED DESCRIPTION

Figure 7:
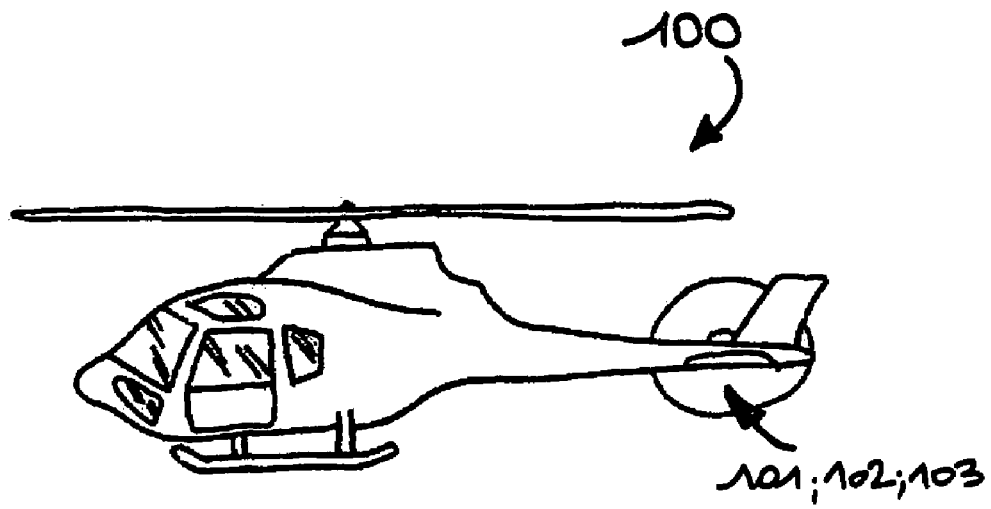
FIG. 7 is a diagrammatic longitudinal elevation view of a rotary wing aircraft in accordance with the invention, i.e. a helicopter.

FIG. 1 shows a prior art composite structural assembly 20 of monolithic type.

The assembly 20 is constituted by stacking individual plies comprising textile reinforcement impregnated in an organic matrix. The plies 21, 22, and 23 have respective orientations of 0°, 90°, and 45°.

FIG. 2 shows a prior art composite structural assembly 30 of the sandwich type.

The assembly 30 is provided with a foam core 32 disposed between two layers 31 and 33 of textile reinforcement impregnated in an organic matrix.

FIG. 3 shows a prior art composite structural assembly 30 of the sandwich type, but in this case it has a honeycomb core 32', i.e. a core having hollow cells.

The honeycomb core 32' is disposed between two layers 31, 33 of textile reinforcement impregnated in an organic matrix.

FIG. 4 is a section through a structural assembly having a main core 2.

It is appropriate to recall at this point that such a main core 2 is subjected to static and/or dynamic loads during normal operation of the vehicle in which it is to be integrated.

The core 2 is not itself capable of revealing damage it has suffered from its environment.

In implementations of the invention that are not shown, the main core 2 may be made of metal or of material(s) other than composite materials.

In FIG. 4, the core 2 is a composite of the monolithic type 20 or of the sandwich type 30.

It should be observed that the main core 2 is provided with a laminated surface covering 1 for protecting it against the aggressions to which it might be subjected.

In brief, FIG. 4 shows a composite structure in accordance with the invention for protecting the main core 2.

Figure 8:
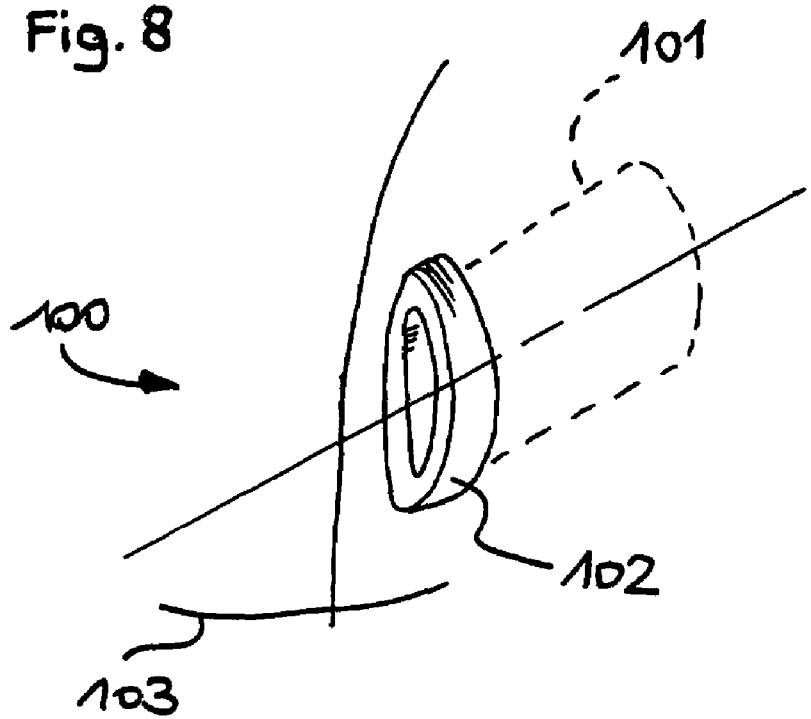
FIG. 8 is a diagrammatic perspective view of a structural assembly having a protective composite structure of the invention in a zone where a tail spar tube of a rotary wing aircraft is received, which tube constitutes the main core that is to be protected.

This composite structure is to remain attached to a destination vehicle such as a helicopter 100 as shown in FIGS. 7 and 8.

As mentioned above, the composite structure comprises at least one laminated surface covering 1, itself provided with at least:

an elastomeric member 3; and a rigid protective layer 4.

As described below, a damage tell-tale 5 is also arranged in the laminated surface covering 1.

In this case, the laminated surface covering 1 is made up of a rigid protective layer 4 of metal or composite material, and an elastomeric member 3 arranged between the main core 2 and the protective layer 4.

In one implementation, the elastomeric member 3 is constituted by a single strip 7, e.g. of a visco-stressed elastomer having high dissipating power.

In an implementation, the elastomeric member 3 having a single strip 7 or the corresponding member 3 having a plurality of strips 7, the member is constituted exclusively from at least an elastically-deformable material with little compressibility and does not have any fiber reinforcement or the like.

The tell-tale 5 is such that in the event of the composite structure suffering an attack from its environment, in particular an impact, with energy greater than a predetermined threshold such that the attack inflicts damage to the main core 2, this damage is revealed by the laminated surface covering 1.

In an implementation, the tell-tale 5 is interposed within the laminated surface covering 1.

For example, the tell-tale 5 is interposed between the outermost protective layer 4 of the composite structure and an elastomeric member 3 placed substantially adjacent thereto.

In another implementation, the tell-tale 5 is a dye, i.e. a liquid and/or in the form of a film.

Alternatively, the tell-tale 5 can be a plastically-deformable layer of the covering 1, such as an outer protective layer 4 of ductile material such as a soft metal or the like.

By means of the tell-tale 5, the invention makes it possible to protect the main core 2 of the vehicle 100 against attack from the environment, and in particular against impact.

More specifically, when a low level of attack is applied by the environment to the composite structure, then:

the attack is initially intercepted by the protective layer 4 interposed for this purpose at least in part between the main core 2 and a zone A (see FIG. 5) from which the environment might deliver impacts; and at least a portion of the energy intercepted from the attack from the environment by the interposed layer 4 is then distributed and/or absorbed by the laminated surface covering 1.

In contrast, in the invention, when the attack from the environment on the composite structure presents energy above a predetermined threshold liable to inflict damage on the main core 2, at least a portion of the energy is transferred to the main core 2 and also to the tell-tale 5 integrated at least in part for this purpose in the composite structure, in order to reveal the damage.

In other words, protection from damage and revelation of damage are obtained conjointly.

Depending on the design requirements of the core 2 and/or the vehicle 100, the protection of the core 2 relates to attack from the environment by way of impact and also to any other type of attack of mechanical nature, for example erosion and/or nicking or grooving, or the like.

This protection of the core 2 serves, when there is a need, also to provide protection against environmental attack of a physicochemical nature, for example heating and/or exposure to flame and/or electromagnetic discharge such as lightning.

In FIG. 4, a damage tell-tale 5, a liquid dye or a color film, is inserted between the elastomer member 3 and the protective layer 4.

With reference to FIG. 5, the covering 1 is provided with a protective stack and two elastomeric stacks.

The elastomeric member 3 is provided with two elastomeric stacks each comprising a rigid intermediate ply 6 of composite material or metal, disposed between two elastomer strips 7. Overall, there are thus three elastomer strips 7 and two rigid intermediate plies 6.

The rigid protective layer 4 is provided with a protective stack comprising a first main ply 4' of metal and a second main ply of composite material 4".

FIG. 6 is a section through a composite structure of the invention having a removable laminated surface covering.

The laminated surface covering 1 is attached to a main core 2 by a mechanical fastener M. The fastener may be a screw, a pin, a collar, or any other equivalent means that is also capable of being mechanically dismantled.

With reference to FIGS. 4 and 5, when the laminated surface covering 1 is held on the main core 2 by a bonding technique, e.g. using adhesive, the following deposition methods can be used:

- peeling the laminated surface covering 1;
- hot deposition;
- using a hot "cheese" wire to cut the last elastomer strip, i.e. the elastomer strip situated against the main core 2;
- cold deposition with the elastomer being cooled to below its glass transition temperature; and
- ablation by pumicing.

Hot deposition is performed by heating the elastomer, by immersing it in a hot enclosure, or by directing a hot flow against the peeling front, for example. Depending on the nature of the elastomer, this method can make it possible, for example, to reduce the force required for deposition to a level below the threshold for damaging the main core 2.

Similarly, cold deposition can be performed, for example, by immersing the composite structure in a cold enclosure or by spraying a low temperature fluid (generally liquid nitrogen) on the peeling front. Cooling then causes the elastomer to break or to adhere on the main core 2.

Finally, ablation by pumicing the laminated surface covering 1 can be total or partial. If ablation is partial, chemical stripping is undertaken so as to eliminate the last strip of elastomer.

In FIGS. 7 and 8, reference 100 is an overall reference for a rotary wing aircraft. Specifically, the aircraft 100 is a helicopter. The aircraft 100 is sometimes referred to below as a "vehicle".

The helicopter 100 possess a composite structure within a connection zone 101 for receiving a tube 102 constituting a spar of a tail 103.

In the invention, a core 2, represented symbolically by dashed lines in FIG. 8, is made of composite material and is liable to be subjected to attack from the environment, including impacts.

For example, while the vehicle 1 is being maintained, a tool might be dropped onto the core 2 which is a vital component of the vehicle 1.

A standard specifies that the tube to be protected must be capable of withstanding an impact of about 40 joules, and as a result it needs to be protected.

In addition, since the core 2 is a composite core in this example, it is possible for no visible trace to be left by an impact that is capable of causing the core to fail structurally. It should be understood that an impact of 30 joules suffices to delaminate composite material.

It is in this context that the core 2 is associated in this example with a protective and tell-tale structure having a surface covering 1 comprising at least:

- a protective layer 4 against the connection zone 101; and
- an elastomeric member 3 against a spar tube 102.

Thus, a composite structural assembly is obtained in which the tube constitutes the core 2 and is covered in a protective and tell-tale covering 1 against impacts.

Naturally, the invention can be implemented in a wide variety of ways.

Although a plurality of implementations are described above, it will readily be understood that it is not conceivable to identify exhaustively all possible implementations. Any of the means described could naturally be replaced by equivalent means without going beyond the ambit of the invention.

As mentioned above, composite structures are generally sensitive to point impacts or shocks.

However such composite structures are sometimes also sensitive to erosion, due to rain or sand, since the effect thereof on composite structures is more pronounced than it is on metal structures.

Reference is made in document DE 4 208 842 to metal protections, for example metal covers positioned on the leading edges of rotorcraft rotor blades, for the purpose improving resistance to erosion.

Nevertheless, problems of galvanic coupling caused by the potential difference that exists between the textile reinforcement of the composite structure and the metal of the protection can arise.

In addition, although textile reinforcement does conduct electricity to some extent, it is much less conductive than most metal alloys commonly used in industry. Such low electrical conductivity lies behind the poor behavior of composite structures in the face of lightning.

Direct currents emitted or induced in the structure are evacuated very poorly, particularly if the composite contains glass fibers, giving rise to delaminations and to fibers breaking. In order to withstand lightning better, composite structures need to be metallized on their outside surfaces, generally by adding metal foil made of copper. Such protection considerably increases the weight of the final structure and also leads to extra costs in terms of raw materials and fabrication.

Furthermore, composite structures are also more sensitive to flame than are metal structures. Aviation standards concerning flame resistance require a specified residual level of static mechanical strength to remain after five or fifteen minutes exposure to a flame at a temperature of 1100° C. This specification is often required for parts situated in the vicinity of vehicle engine compartments. Protection for withstanding flame that is both heavy and expensive is often added or stuck to the composite structure that is to be protected, thereby leading to extra costs.

Finally, temperature directly affects the performance of composite structures insofar as it can damage three-dimensional bridging between the chains or the macromolecular lattice of the organic matrix. These chemical bonds between the polymer chains are the result of a cross-linking reaction that is triggered in an autoclave or in a mold body.

When the outside temperature exceeds the glass transition temperature of the cross-linked organic matrix, the strength of the composite quickly disappears. Thermal protection is generally positioned on those faces of the composite that are exposed to high levels of heat flux, for example engine cowlings. The state of the art refers to numerous kinds of thermal protection that are co-fired or fitted and bonded after polarization of the composite structure.

In addition to the relative vulnerability of composite structures to environmental stresses and shock, special treatment needs to be applied to certain composite structures that are subjected to severe soundproofing specifications.

Composite structures have specific stiffness, i.e. ratio of stiffness over density, that can be five to ten times greater than that of metal alloys. In addition, since their deformation is purely elastic, unlike metal alloys, composite structures have little damping or dissipating power.

Unfortunately, the amplitude and the frequency of sound noise depend directly on the mass, the stiffness, and the damping of the composite structure, so the structure is less good at filtering sound noise, whether solid-borne or air-borne, than is a structure made of metal.

Consequently, soundproofing of a composite structure requires thicker layers of soundproofing material than does a metal structure.

A composite structure is thus subjected to various kinds of attack due not only to impacts, but also to environmental conditions (erosion, lightning, temperature, flame), and depending on where it is used, it might also need to be subjected to specific soundproofing treatments.

Many means are known for protecting such composite structures, but none of them serves to solve the problem overall.

In addition, since attack generally does not leave any visible traces on the composite structure, it is necessary to use techniques that are expensive and difficult to implement in order to detect any defects that might have been generated by an attack.

The invention makes it possible to retain the main advantages inherent to composite structure, namely low density, and good mechanical behavior, while greatly limiting the effects of external attack that generally weaken the structural integrity of composite structures. In addition, the invention also seeks to make it possible to detect visually whenever an attack has in fact led to damage.

According to the invention, a composite structure provided with a main core, of monolithic or sandwich type, includes in remarkable manner a laminated surface covering provided with a rigid protective layer and an elastomeric member, the elastomeric member being arranged, for example, between the main core and the rigid protective layer.

The use of a laminated surface covering makes it possible to avoid the various kinds of damage that are generally encountered on organic composites.

In addition, the invention optimizes the vibration performance of the composite structure. The nature and the dimensioning of the elastomeric member and of the rigid protective layer makes it possible to attenuate the vibration level of the structure by a dissipative effect of the elastomer, and/or an effect whereby solid-borne or air-borne noise is filtered, and/ or by a resonator effect, i.e. vibro-acoustic attenuation by the rigid covering vibrating in phase opposition to the excitation.

In addition, the rigid protective layer is constituted either by a metal, or by an organic composite material. The intrinsic mechanical characteristics of these elements (dimensions, stiffness moduluses, breaking strengths, elastic limits, etc.) can be selected and optimized as a function of the external stress levels that are to be accommodated.

The effect of the rigid protective layer is to increase the energy level that will lead to the appearance of damage in the composite structure. In particular, it enables mechanical impacts to be damped by avoiding the pinching effect of the impacting object and the high local stresses that generates, and also by spreading the force of an impact over a greater area.

A fraction of the energy released by an impact is absorbed by deforming rigid protective layer of the covering, in particular by plastic deformation when the layer is made of metal.

Advantageously, the rigid protective layer is a multilayer rigid protective layer comprising at least one stack referred to below as the "protective" stack having a first protective ply of metal and a second protective ply of organic composite material. Such a multilayer structure provides greater ability to withstand shock and attack from the environment, in particular erosion. The stiffness and the low mass of the organic composite layers are thus associated with the plastic behavior, and the electrical and thermally conducive nature of metal alloys.

Furthermore, the elastomeric member comprises either a single strip of elastomer or at least one stack, referred to below as the "elastomeric stack", made up of an intermediate rigid ply of metal or of organic composite material inserted between two strips of elastomeric material.

In addition, by deforming, this elastomeric member also contributes to absorbing the energy of an impact and, like the rigid protective layer, serves to raise the threshold energy liable to lead to delamination within the main core.

The mechanical characteristics of the elastomeric member can be optimized when a soundproofing specification is to be complied with. Under such circumstances, it is possible, for example, to use a damping elastomer having high dynamic dissipating power in implementation of the known technology of visco-stressed elastomers.

In addition, the elastomeric member can absorb a fraction of the solid-borne noise, e.g. as generated in helicopters by the rotation of its dynamic assemblies: gearboxes and transmission unit bearings, and air-borne noise by working in shear, thereby dissipating vibratory energy by raising temperature. The formulation of the elastomer used determines its modulus of stiffness, dissipating power, and viscoelastic behavior, and can thus be adapted as a function of the required temperature and frequency spectra.

Consequently, a laminated surface covering as made in this way by associating a rigid protective layer that is electrically and thermally conductive in its plane with an elastomeric member constitutes a system that withstands impact, heat, lightning, and also flame.

Furthermore, alternating strips of elastomer and rigid plies makes it possible to optimize the damping covering for a plurality of operating temperature or frequency ranges. To do this, for two distinct strips, it suffices to make use of two distinct polymers having stiffness and damping characteristics that vary depending on temperature and applied frequency (a phenomenon which is associated with their glass transition ranges).

Similarly, two distinct rigid plies can have different definitions (the nature, dimensions, and materials characteristics) so as to optimize the various properties required of the protection. Thus, for example, the laminated surface covering comprises an intermediate rigid ply and a strip of elastomer material with optimized heat resistance to provide protection against flame, followed by an intermediate rigid ply and a strip of elastomer material that are optimized for shock absorption.

Furthermore, the laminated surface covering of the invention enables any damage that might have been caused to the composite structure as a result of an external attack to be detected visually.

The rigid protective layer and the elastomeric member are of calibrated thickness and stiffness. Consequently, the geometrical characteristics (depth, dimensions) of the imprint left in the laminated surface covering by an impact make it possible to define an action criterion.

Furthermore, the laminated surface covering is advantageously provided with a damage tell-tale. This tell-tale, arranged between the elastomeric member and the rigid protective layer, is either a liquid dye or a color film. In the event of damage, it serves to leave a permanent visible trace having characteristics (shape, depth, apparent diameter, color) giving maintenance personnel information about the severity of the damage and providing an action criterion (return to normal operation with or without restrictions, rejection, repair).

Because of its particular makeup, the composite structure proposed by the invention thus makes it possible to increase its ability to withstand impacts considerably, to protect it effectively against attack from the environment, and to dissipate internal noise that can be heard by the occupants of the vehicle on which the composite structure is mounted. In addition, it makes it possible to detect and quantify any defects that might occur due to external attack.

Finally, in a variant of the invention, the laminated surface covering is removable, i.e. it can be separated from the main layer. This detachability presents numerous advantages.

Firstly, because of its function, the removable laminated surface covering of a composite structure mounted on a vehicle can become irrevocably damaged by an impact without the main core suffering. Under such conditions, only the laminated surface covering needs to be replaced and that is of great advantage in terms of expense.

Secondly, the composite structure is subjected to attack having a variety of origins which thus leads to a possibility of using a particular laminated surface covering for a particular occasion. For example, mention can be made of maintenance operations during which the main core needs to be protected against impacts due to tools. Similarly, the composite structure needs to be armored when atmospheric conditions are particularly severe (thunderstorm, large amounts of sand in the atmosphere, etc.). Under normal conditions, the laminated surface covering is not used, thereby lightening the composite structure and consequently the vehicle on which it is arranged.

In addition to providing protection against impacts and enabling damage to be detected, the organic composite structure of the invention possesses other advantages that are not negligible due to the insulating nature of the elastomer.

Integrating a resistive heater element on the rigid protective layer makes it possible to provide a de-icing device that is highly effective since losses of heat by conduction towards the main core are reduced by the elastomer. Furthermore, the main core suffers less heating, thereby avoiding degrading its characteristics.

The thermally insulating nature of the organic composite structure serves to reduce its infrared signature, which is particularly useful when such a structure is situated around a hot zone of an aircraft, for example if it is used for making an engine cowl.

In the same spirit, using a stack made up of a plurality of strips of elastomer material having different electromagnetic impedances can serve to absorb electromagnetic radiation, thereby increasing electromagnetic furtiveness.

What is claimed is:

1. A method of protecting a main core (2) of a vehicle against an attack originating from an environment surrounding the vehicle, comprising the steps of:
   attaching a composite structure to the main core(2), said composite structure comprising at least a laminated surface covering (1) with at least one elastomeric member (3), a protective layer (4), and a damage tell-tale (5);
   initially intercepting an attack from the environment to the composite structure by the protective layer (4), the protective layer interposed at least in part between the main core (2) and an attack zone of the environment from which an impact from the attack occurs; and
   distributing and/or absorbing at least a fraction of an attack energy intercepted from the attack by the protective layer (4) by the laminated surface covering (1),
   wherein, upon the attack energy being above a predetermined threshold suitable for subjecting the main core (2) to damage, at least a fraction of said attack energy is transferred to the main core (2) and also to the damage tell-tale (5), the damage tell-tale (5) being integrated at least in part in the composite structure and configured to reveal the damage to the main core (2) as a visible trace in the composite structure.

2. The method according to claim 1, wherein the attack comprises an impact and at least one other mechanical attack.

3. The method according to claim 1, wherein the attack comprises an impact and at least one other attack having a physicochemical nature.

4. A composite structure for protecting a main core (2), to which said composite structure is to be held attached within an intended vehicle, the composite structure comprising:
   a laminated surface covering (1), having at least one elastomeric member (3) and a rigid protective layer (4);
   a damage tell-tale (5) arranged in the laminated surface covering (1), said tell-tale (5) being configured, upon an attack being applied to the composite structure originating from an environment surrounding the vehicle having an energy greater than a predetermined threshold such that the attack subjects a damage to the main core (2), to cause the damage to the main core(2) to be revealed as a visible trace in the laminated surface covering (1).

5. The composite structure according to claim 4, wherein the damage tell-tale (5) is interposed within the laminated surface covering (1).

6. The composite structure according to claim 4, wherein the damage tell-tale (5) is a colored dye having a liquid form.

7. The composite structure according to claim 4, wherein the damage tell-tale (5) is a plastically-deformable layer of the laminated surface covering (1).

8. The composite structure according to claim 4, wherein the main core (2) and the composite structure are integrated one to the other.

9. The composite structure according to claim 4, wherein the composite structure is configured to be attached to the main core (2) by mechanical means in a separable manner.

10. The composite structure according to claim 4, wherein the elastomeric member (3) comprises a single strip of elastomeric material.

11. The composite structure according to claim 4, wherein the elastomeric member (3) comprises at least one elastomeric stack made up of an intermediate rigid ply arranged between two strips of elastomeric material.

12. The composite structure according to claim 11, wherein at least one intermediate rigid ply comprises a metal.

13. The composite structure according to claim 11, wherein at least one intermediate rigid ply comprises an organic composite material.

14. The composite structure according to claim 4, wherein the rigid protective layer (4) is constituted by a metal.

15. The composite structure according to claim 4, wherein the rigid protective layer (4) is constituted by a composite material.

16. The composite structure according to claim 4, wherein the elastomeric member (3), having a single strip or a set of strips of elastomeric material in said member (3), is constituted exclusively of at least one elastically deformable material of low compressibility, and is free of fiber reinforcement.

17. The composite structure according to claim 4, wherein the protective layer (4) comprises at least one protective stack provided with a first main ply of metal and a second main ply of organic composite material.

18. The composite structure according to claim 4, wherein the damage tell-tale (5) comprises a colored film.

19. The method according to claim 4, wherein the attack comprises an impact.

* * * * *